United States Patent
Alimpich et al.

(10) Patent No.: US 8,885,184 B2
(45) Date of Patent: Nov. 11, 2014

(54) INSERTION OF JOB TICKETS INTO JOB TICKETS OF ANOTHER LANGUAGE

(75) Inventors: Claudia Alimpich, Boulder, CO (US); Dennis M. Carney, Louisville, CO (US); Reinhard H. Hohensee, Boulder, CO (US); Harry R. Lewis, Longmont, CO (US); David E. Stone, Seal Rock, OR (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 303 days.

(21) Appl. No.: 13/426,215

(22) Filed: Mar. 21, 2012

(65) Prior Publication Data

US 2013/0250325 A1 Sep. 26, 2013

(51) Int. Cl.
*G06F 3/12* (2006.01)

(52) U.S. Cl.
USPC .......................... 358/1.13; 358/1.14; 358/1.15

(58) Field of Classification Search
None
See application file for complete search history.

(56) References Cited

U.S. PATENT DOCUMENTS

| | | | |
|---|---|---|---|
| 5,923,013 A | 7/1999 | Suzuki et al. | |
| 6,097,498 A | 8/2000 | Debry et al. | |
| 6,209,010 B1* | 3/2001 | Gauthier et al. | 715/234 |
| 6,833,925 B1 | 12/2004 | Igoe et al. | |
| 8,031,359 B2 | 10/2011 | Hino et al. | |
| 8,031,369 B2 | 10/2011 | Ducato | |
| 2007/0136226 A1 | 6/2007 | Irick | |
| 2008/0180728 A1 | 7/2008 | Sekine | |
| 2009/0116055 A1 | 5/2009 | Ocke et al. | |
| 2009/0279124 A1 | 11/2009 | Liu et al. | |
| 2010/0134827 A1 | 6/2010 | Weber et al. | |
| 2012/0019866 A1 | 1/2012 | Kuroshima | |
| 2012/0212775 A1* | 8/2012 | Jahn | 358/1.15 |

OTHER PUBLICATIONS

Joanne Cummings, "IBM's Rich Howarth: Be a partner, not a commodity" downloaded from S:\51000 IPS\51000-174 BLD9-2011-0040-US1\Formal\IDS\IBM's Rich Howarth Be a partner, not a commodity—Web Design.htm on Mar. 21, 2012.

* cited by examiner

*Primary Examiner* — Mark Zimmerman
*Assistant Examiner* — Darryl V Dottin
(74) *Attorney, Agent, or Firm* — Duft Bornsen & Fettig LLP

(57) ABSTRACT

Systems and methods are provided for wrapping a job ticket for a print job within a job ticket defined according to another language. One embodiment is a system comprising a client operable to acquire print data for a print job, and a job ticket manager. The job ticket manager is operable to generate a first job ticket that is defined according to a first language, and to wrap a second job ticket defined according to a second language within the first job ticket. The client is further operable to transmit the print data and the first job ticket to a server operable to process job tickets defined according to the first language.

35 Claims, 6 Drawing Sheets

INSERTION OF JOB TICKETS INTO JOB TICKETS OF ANOTHER LANGUAGE

FIELD OF THE INVENTION

The invention relates to the field of printing, and in particular, to job tickets used to direct the processing of a print job.

BACKGROUND

In the field of printing, users desire systems that allow for flexible processing of print jobs. Print jobs typically comprise print data (i.e., the data used to generate a printed output) as well as a job ticket. The job ticket defines processing steps that may be performed for the print job. For example, the job ticket may request that the print data be given a "preflight" analysis before printing in order to check for errors, may request that the printed output be stapled, may define a media or marking material to be used during printing, etc. The processing steps defined by a job ticket may also be referred to as a workflow.

Job tickets may be defined in a number of formats. For example, Job Definition Format (JDF) is a popular Extensible Markup Language (XML) format used for storing job ticket instructions. Similarly, Advanced Function Presentation (AFP) job tickets may be used to define AFP workflows including print data and printer-server communications. While users desire printing systems that are highly interoperable with each other, there remains no way to integrate support for JDF job tickets in AFP architecture. This is unfortunate because users that have a substantial investment in AFP may wish to leverage their existing production printing equipment in order to utilize workflows defined in JDF.

SUMMARY

Embodiments described herein acquire a first job ticket in a first language (e.g., AFP), and insert a second job ticket in a second language (e.g., JDF) within the first job ticket. Using a wrapper to encapsulate the second job ticket within the first job ticket allows the second job ticket to travel in its native format through, for example, an AFP printing environment. Thus, when the second job ticket is presented to a printer having the capability of processing the second job ticket, there are no translation errors or other issues.

One embodiment is a system comprising a client operable to acquire print data for a print job, and a job ticket manager. The job ticket manager is operable to acquire a first job ticket that is defined according to a first language, and to wrap a second job ticket defined according to a second language within the first job ticket. The client is further operable to transmit the print data and the first job ticket to a server operable to process job tickets defined according to the first language.

In a further embodiment, the job ticket manager is further operable to wrap the second job ticket within the first job ticket by inserting the second job ticket into a data structure of the first job ticket without modifying the second job ticket.

In a further embodiment, the job ticket manager is further operable to generate the first job ticket to include Advanced Function Presentation (AFP) instructions, and to generate the second job ticket to include Job Definition Format (JDF) instructions.

In a further embodiment, the first job ticket comprises an AFP Form Map, and the job ticket manager is further operable to wrap the second job ticket within an Object Container structure of a Medium Map of the AFP Form Map (Form Maps are also known as "Form Defs").

In a further embodiment, the job ticket manager is further operable to wrap the second job ticket within an Object Container structure that includes a tag identifying the language of the second job ticket as JDF.

In a further embodiment, the first job ticket comprises an AFP Form Map, and the job ticket manager is further operable to divide the second job ticket into multiple segments that each include instructions for processing a group of pages of the print data, and to wrap each segment within an Object Container structure of a Medium Map of the AFP Form Map.

In a further embodiment, the client is further operable to acquire print data comprising at least one logical page defined according to a Page Description Language (PDL).

Another embodiment is a system comprising a server. The server is operable to receive print data, to receive a first job ticket that comprises instructions for processing the print data and that is defined according to a first language, and to analyze the first job ticket to identify a second job ticket that is wrapped within the first job ticket and defined according to a second language. The server is further operable to extract the second job ticket from the first job ticket, to transmit the extracted second job ticket to the print controller for processing, and to transmit the print data to a print controller for printing.

Another embodiment is a system comprising a print controller. The print controller is operable to receive print data for a print job, to receive a communication defined according to a first language, and to receive a job ticket defined according to a second language and wrapped in the communication. The print controller is further operable to analyze the communication to identify the job ticket, to extract the job ticket from the communication defined according to the first language, and to process the received print data in accordance with the job ticket defined according to the second language.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
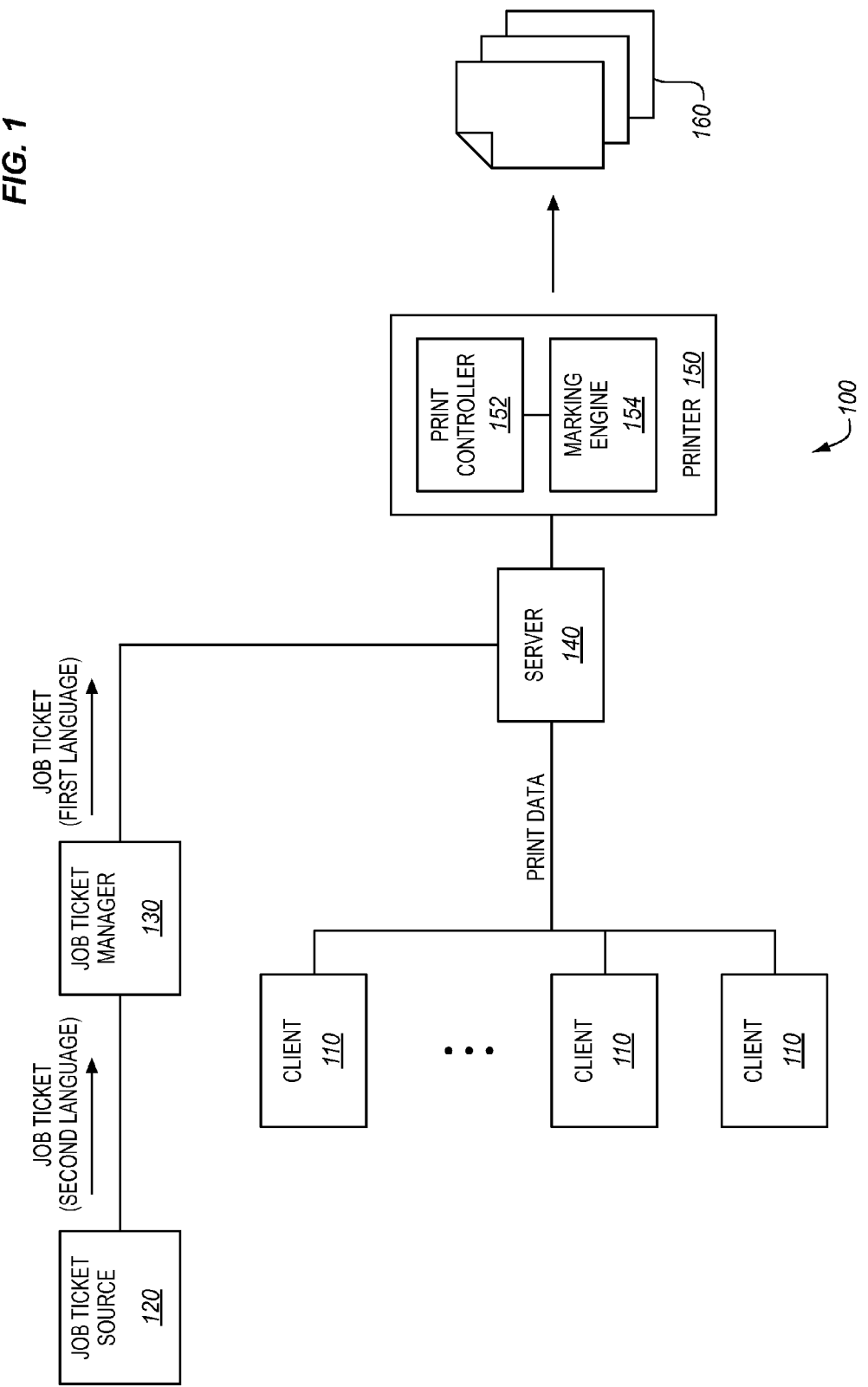
FIG. 1 is a block diagram of a printing system in an exemplary embodiment.

FIG. 1 is a block diagram of a printing system 100 in an exemplary embodiment. Printing system 100 comprises any system, device, or component operable to process incoming jobs to generate a printed output. In this embodiment, printing system 100 comprises multiple clients 110 operable to communicate print data to a server 140, a job ticket source 120 operable to acquire a job ticket, and a job ticket manager 130. In this embodiment, printing system 100 also comprises a printer 150 operable to receive print data and job tickets transmitted by server 140, and to generate printed output 160 based upon received print data and job tickets. Printing system 100 is enhanced in that a job ticket defined according to a first language (e.g., AFP) may be used to wrap job tickets from a source encoded according to a second language (e.g., JDF).

Clients 110 comprise any systems, components, or devices operable to acquire print data and provide it to server 140 for processing. Typically, clients 110 will each comprise a workstation having a user interface, a physical display, and a processor operable to manage instructions from a print operator. Thus, by using clients 110, a print operator may submit print data for printing, may trigger the creation of a job ticket, may generate or acquire print data, and may otherwise interact with printing system 100. While multiple clients 110 are depicted with regard to FIG. 1, the number and type of clients 110 may vary as a matter of design choice.

Job ticket source 120 and job ticket manager 130 are operable together to acquire a first job ticket defined according to a first language and to wrap a second job ticket defined according to a second language within the first job ticket.

Job ticket source 120 comprises any system, component, or device operable to acquire a job ticket defined according to a second language. For example, job ticket source 120 may be capable of generating JDF job tickets based upon print job processing requests submitted via one or more clients 110. These processing requests may indicate a predefined set of workflow actions to perform upon the print job, or may define a customized series of actions to perform upon the print job. Job ticket source 120 may be further operable to acquire job tickets stored in a (remote or local) memory. While job ticket source 120 is depicted as separate from clients 110, in one embodiment each client 110 may include a job ticket source 120 capable of generating job tickets.

Job ticket manager 130 comprises any system, component, or device operable to wrap a job ticket received from job ticket source 120 within a job ticket defined according to a first language. For example, job ticket manager 130 may encapsulate received JDF job tickets within an AFP job ticket. While job ticket manager 130 is depicted as separate from clients 110, in one embodiment each client 110 may include a job ticket manager 130 capable of encapsulating received job tickets.

In one embodiment, a client 110 comprises both job ticket source 120 and job ticket manager 130. Such a client 110 may further comprise enhanced interfaces for user interaction and communication with server 140. In further embodiments, the client 110 may include a memory for accessing print data and/or stored job tickets for printing system 100.

Server 140 comprises any system, component, or device operable to manage the operations of printing system 100. For example, in this embodiment server 140 is operable to receive print data and to receive job tickets associated with the print data in order to form a complete print job. In embodiments where server 140 is AFP-compliant, server 140 may process AFP print files and received AFP job tickets in order to generate a stream of Intelligent Printer Data Stream (IPDS) messages for transmission to printer 150. In a typical AFP workflow process, server 140 receives an AFP job ticket comprising multiple Medium Maps, wherein each Medium Map includes a number of AFP instructions for processing a group of pages of an AFP print file. Server 140 then processes the AFP instructions of a Medium Map and the group of pages in the AFP print file indicated by the Medium Map to generate a stream of IPDS communications. In situations where only one Medium Map is included, that Medium Map may include instructions for all of the pages of the AFP print file.

When an AFP job ticket is received that encapsulates a job ticket defined according to another language, server 140 may detect the container encapsulating the job ticket, and may process the container in order to extract the container from the AFP job ticket and submit the encapsulated job ticket to printer 150. For example, if the encapsulated job ticket is included within an Object Container Data portion of a Medium Map, the encapsulated job ticket may be placed, in encapsulated form, within an IPDS communication for transmission to printer 150 in an unaltered format.

Printer 150 comprises any system, component, or device operable to generate a printed output based upon data received from server 140. In this embodiment, printer 150 comprises print controller 152 and marking engine 154. Print controller 152 is operable to process print data in order to generate rasterized content for marking engine 154. Furthermore, print controller 152 is operable to receive an encapsulated job ticket, to identify the language of the encapsulated job ticket, and to extract the encapsulated job ticket in order to direct processing of the print data. Thus, print controller 152 includes logic for processing job tickets defined according to the language of the encapsulated job ticket. For example, if the job ticket defines a media for the print data (e.g., a size, weight, sheen, etc. of the media), print controller 152 may alter the way in which the print data is rasterized in order to ensure a desirable output (i.e., glossy paper may use a different rasterized version of the data than regular paper, because ink is retained on the paper differently). In further embodiments, print controller 152 may be separate from or integral with printer 150.

Marking engine 154 comprises any system, component, or device operable to generate a printed output based upon received data from print controller 152. Marking engine 154 may utilize a marking material such as toner or ink in order to mark media, or may comprise components operable to emboss or cut out portions of media in order to generate a printed output. Marking engine 154 may utilize a number of trays to source its media, or may utilize rolls of continuous-form printing media.

Further details of the operation of printing system 100 will be discussed with regard to FIG. 2. Assume, for this embodiment, that a print operator at client 110 desires to generate a print job and submit it for printing.

Figure 2:
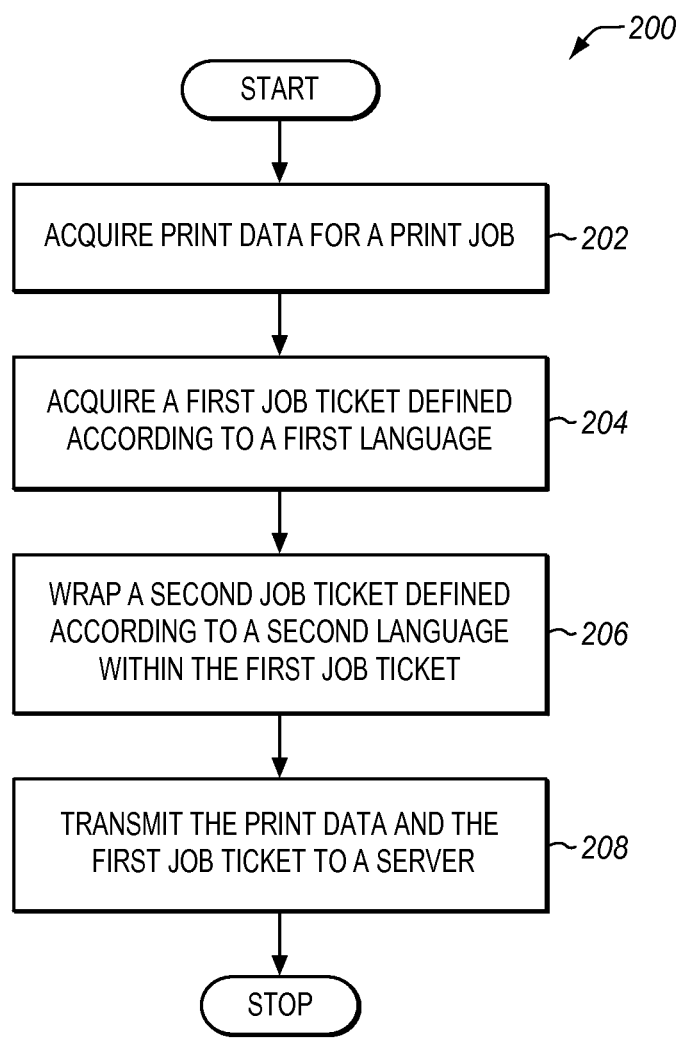
FIG. 2 is a flowchart illustrating a method for wrapping a job ticket in a job ticket defined according to another language in an exemplary embodiment.

FIG. 2 is a flowchart illustrating a method 200 for wrapping a job ticket in a job ticket defined according to another language in an exemplary embodiment. The steps of method 200 are described with reference to printing system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, a client 110 of printing system 100 acquires print data for a print job. The print data may be defined, for example, according to a Page Description Language (PDL). The print data may be generated at client 110, or may be selected via client 110 for printing. In addition, client 110 may acquire or generate print job processing requests indicating a workflow of operations requested to be performed upon the print job. These operations may include, for example, sorting pages of the printed document, hole-punching the printed document, selecting a media for printing the document, etc.

In step 204, job ticket manager 130 acquires a first job ticket defined according to a first language (e.g., the job ticket may be an AFP job ticket). For example, the first job ticket may be acquired from job ticket source 120. In one embodiment, acquiring the first job ticket involves generating the first job ticket at job ticket manager 130. This first job ticket may comprise instructions indicated in the print processing requests, or may be a "dummy" job ticket that includes no content for managing the workflow of the print job, and is merely intended to wrap another job ticket.

Further, job ticket manager 130 receives a second job ticket defined according to a second language (e.g., JDF) from job ticket source 120. In one embodiment, job ticket source 120 receives input from a client 110, and retrieves the second job ticket from memory based upon the input. The second job ticket includes instructions for processing the print job, and may, for example, reflect print job processing requests indicated in step 202 described above.

In step 206, job ticket manager 130 wraps the second job ticket within the first job ticket. A number of different techniques may be utilized to wrap the second job ticket within the first job ticket, but the instructions (e.g., the specific commands) of the second job ticket are not translated into another language or otherwise modified during the process. For example, the second job ticket may be placed, in whole, within a comment or other portion of the first job ticket that will not be processed by server 140. If the first job ticket is an AFP Form Map, such a portion may be a container such as an Object Container structure of a Medium Map. In a further embodiment, the second job ticket may be wrapped within the first by attaching the second job ticket to a metadata structure of the first job ticket.

In step 208, client 110 transmits the print data and job ticket manager 130 transmits the first job ticket to server 140. Within the first job ticket, the contents of the second job ticket remain in an unaltered form. Server 140 receives the print data and the first job ticket, and may analyze the first job ticket to identify the second job ticket wrapped within. For example, identifying the second job ticket may comprise identifying an Object Container that includes an Object Container Data (OCD) structure that stores the second job ticket. Identifying the second job ticket may further include parsing a Begin Object Container (BOC) structure of the Object Container indicating that the second job ticket is stored within. In one embodiment, identifying may further comprise reviewing the BOC of the Object Container for a tag that identifies the language of the second job ticket. In this manner, server 140 may select a printer for processing the print job that is capable of interpreting the second job ticket language.

Server 140 then extracts the second job ticket from the first job ticket. This may comprise retrieving an Object Container Data (OCD) structure from an Object Container of the first job ticket that includes the second job ticket, and placing the contents of the Object Container Data (OCD) structure within a corresponding object container in an IPDS communication. Next, server 140 transmits the print data to print controller 152 for printing, and transmits the second job ticket (e.g., within the IPDS command) to print controller 152 for processing.

Print controller 152 receives the print data for processing, and also receives a communication that encapsulates the second job ticket. Print controller 152 then analyzes the communication to identify the second job ticket, and extracts the second job ticket from the communication.

Print controller 152 includes logic for processing job tickets encoded in the first language (e.g., AFP) as well as job tickets encoded in the second language (e.g., JDF). Thus, upon detecting that the job ticket is encoded according to the second language, print controller 152 is operable to process received data in accordance with the instructions of the second job ticket.

Using method 200 of FIG. 2, print operators may advantageously utilize JDF job tickets in order to generate and manage workflows for AFP print jobs. This allows the print operator to utilize a wider variety of workflow generation tools than normally supported by AFP systems.

In a further embodiment, the second job ticket may be a JDF job ticket, and may be broken into multiple segments by job ticket source 120 or job ticket manager 130. Each segment may relate to a group of pages of the print job, and each segment may include a separate set of JDF instructions. Furthermore, each segment may be placed within a different AFP Medium Map, such that the JDF instructions may be processed segment-by-segment by print controller 152 in order to generate a printed output. In such embodiments, each segment may comprise a complete and independent JDF job ticket for its associated group of pages. Alternatively, the entire JDF job ticket may be placed into an AFP Medium Map (e.g., the first medium map for the print job) so that print controller 152 may process the entire job ticket at once, and apply relevant instructions from the job ticket to relevant pages of the print data.

Each Medium Map may specify the pages it should be applied to, and/or server 140 may determine the pages to apply a Medium Map to based upon instructions in contextual information provided with the received print data. Thus, upon processing each Medium Map, server 140 may acquire the appropriate JDF job ticket segments, and may further transmit these segments so that they are received by print controller 152 with time to process the JDF instructions and to apply the instructions to the print data.

In a further embodiment, Medium Maps including AFP instructions may be interspersed with Medium Maps including wrapped JDF instructions. Each Medium Map may be associated with a different group of pages. In this manner, server 140 may process each Medium Map (and associated group of pages) as desired. For example, server 140 may process a first Medium Map including AFP instructions in order to generate IPDS communications directing the operations of printer 150 in processing a group of pages. Server 140 may then process a second Medium Map including JDF instructions, and the JDF instructions may be sent to printer 150 for processing in an IPDS communication, along with print data for another group of pages. Printer 150 may then use a digital front end capable of processing the JDF commands in order to engage in processing the JDF instructions and applying them to the print data. Thus, in this embodiment, server 140 manages the application of AFP instructions to the print data, while printer 150 receives and applies JDF instructions to the print data.

EXAMPLES

In the following examples, additional processes, systems, and methods are described in the context of a printing system capable of handling AFP print jobs having workflows defined in JDF. In these examples, exemplary details of packaging a JDF job ticket within an AFP job ticket (i.e., an AFP Form Map) for later processing will be discussed.

Figure 3:
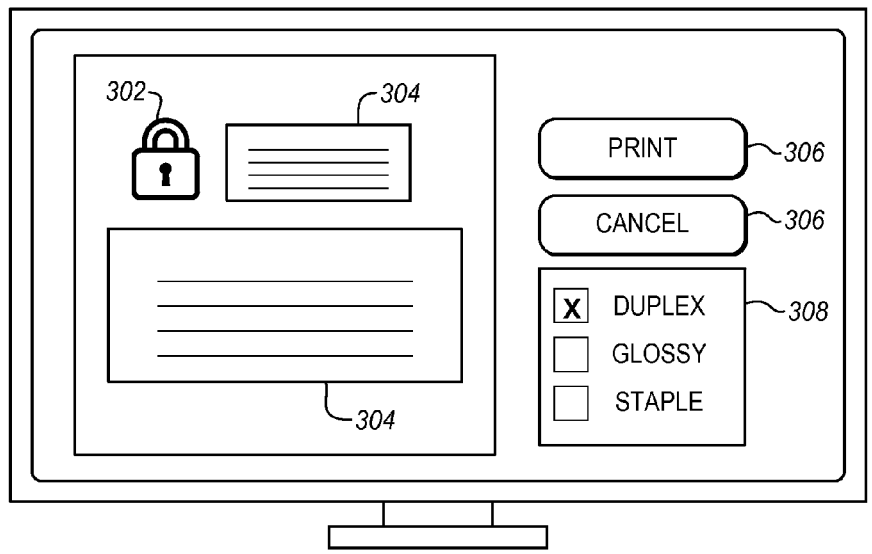
FIG. 3 is a block diagram illustrating a user generating a print job in an exemplary embodiment.

FIG. 3 is a block diagram illustrating a user generating a print job defined by a JDF workflow in an exemplary embodiment. According to FIG. 3, a user operating through a user interface of a client has been provided with a print preview of a document that they wish to print. The document includes one or more graphic elements 302 as well as one or more textual elements 304. These components comprise a portion of the print data for the print job. While the print data appears in rasterized form at the display of FIG. 3, a person having ordinary skill in the art will appreciate that the print data may be stored in a variety of formats that are not necessarily rasterized (e.g., PDL, etc.). The user may utilize buttons 306 in order to schedule the print job for printing or to cancel printing of the job. Furthermore, the user may indicate a number of job processing options 308 which may alter the way that the print job is pre-processed, printed, or processed after printing. For example, in FIG. 3 the user has selected a glossy media to use for printing, which may alter the way in which raster data is generated for the print job when compared with regular media. FIG. 3 has been greatly simplified for the purposes of this discussion. In a typical production printing environment, dedicated and advanced programs will be used to perform each of previewing one or more print jobs, scheduling one or more print jobs for printing/processing at various components of the print shop, and generating job tickets indicating workflows for print jobs.

Figure 4:
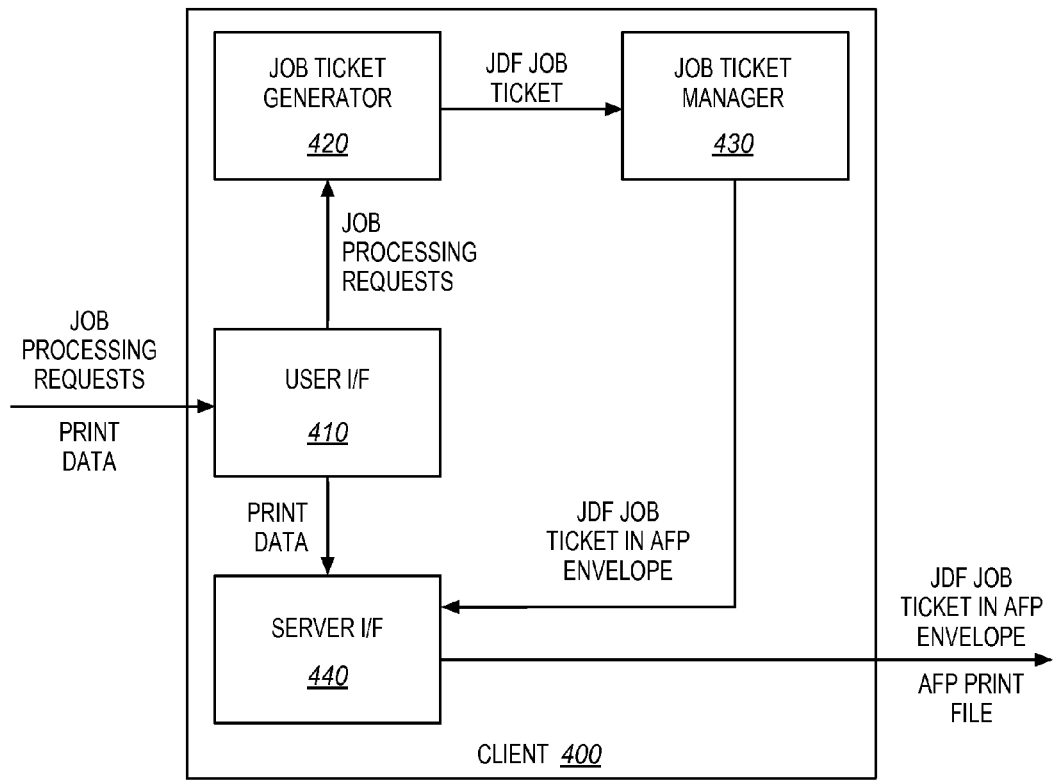
FIG. 4 is a block diagram of a client packaging a JDF job ticket within an AFP job ticket in an exemplary embodiment.
Figure 5:
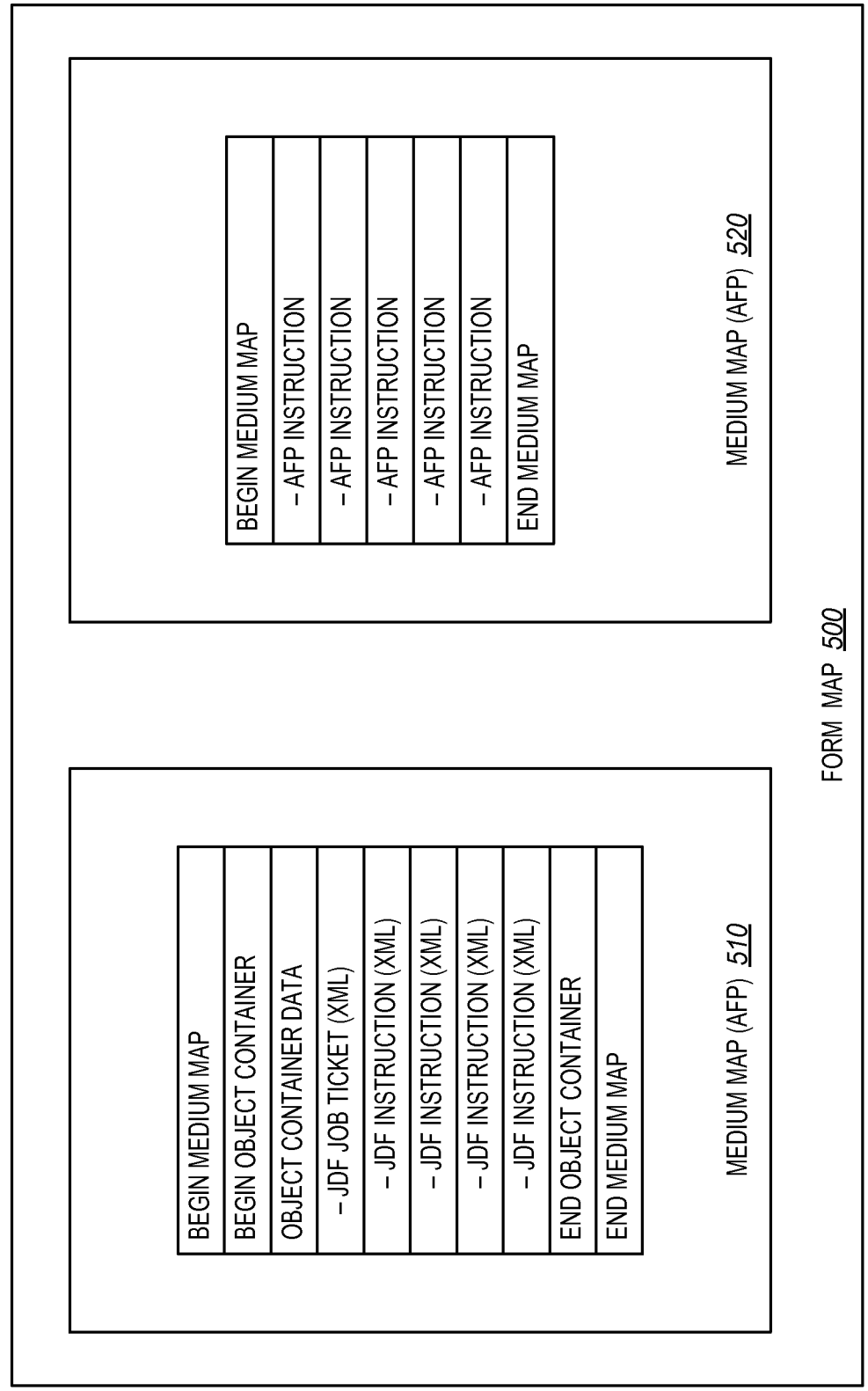
FIG. 5 is a block diagram of an AFP Form Map that includes a Medium Map having AFP commands as well as a Medium Map having a JDF job ticket in an exemplary embodiment.

FIG. 4 is a block diagram of a client 400 packaging a JDF job ticket within an AFP job ticket (i.e., an AFP Form Map) in an exemplary embodiment. According to FIG. 4, client 400 receives one or more print job processing requests defining a workflow at user I/F 410, and also receives print data for a print job. Upon receiving the print data, client 400 may store the print data in a memory or buffer for transmission to a server via server I/F 440, may transmit the print data directly to a server, or may process the print data to generate an AFP print file. Upon receiving the job processing requests, job ticket generator 420 may generate one or more JDF commands within a JDF job ticket that may be performed in order to accomplish the job processing requests. The JDF job ticket is passed to job ticket manager 430, which generates an empty AFP Form Map including a Medium Map having an Object Container structure. The JDF job ticket is then inserted into the Object Container structure for transmission. Client 400 may further transmit the JDF job ticket (within the AFP envelope) as well as the print data to a server for processing. FIG. 5 further discusses exemplary implementations of AFP Form Maps that include JDF job ticket instructions.

FIG. 5 is a block diagram of an AFP Form Map 500 that includes a Medium Map having AFP job ticket instructions as well as a Medium Map having JDF job ticket instructions in an exemplary embodiment. FIG. 5 illustrates a scenario where some workflow instructions are kept in AFP format, while other workflow instructions are kept in a JDF format. In this embodiment, Form Map 500 includes Medium Map 510 as well as Medium Map 520. Medium Map 510 includes an Object Container, which itself includes a Begin Object Container instruction, Object Container Data (OCD), and an End Object Container instruction. Within the OCD, the JDF job ticket is preserved in its native XML JDF format. Thus, no translation or other alteration of the format of the XML JDF instructions has occurred. At the same time, Medium Map 520 includes a number of AFP job ticket instructions for processing the print job. As each AFP Medium Map relates to a different group of pages, a print controller may utilize Medium Map 510 to process a first group of pages according to the JDF instructions, while a server may utilize Medium Map 520 to process a second group of pages according to the AFP instructions, and then transmit those pages to the print controller for printing.

Figure 6:
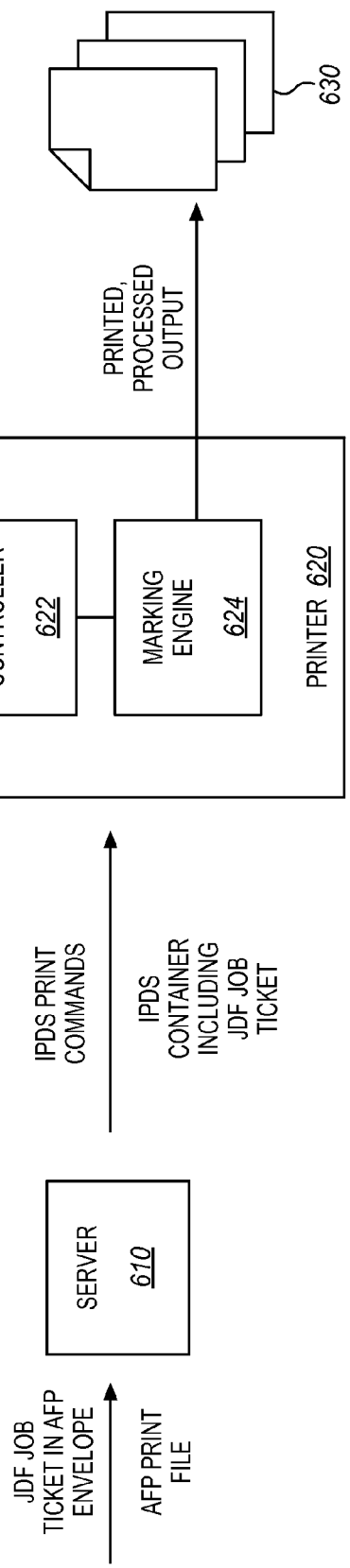
FIG. 6 is a block diagram illustrating processing of job ticket wrapped within another job ticket in order to generate a printed output in an exemplary embodiment.

FIG. 6 is a block diagram illustrating processing of a JDF job ticket wrapped within an AFP job ticket (i.e., an AFP Form Map) in order to generate a printed output in an exemplary embodiment. According to FIG. 6, a server 610 receives a JDF job ticket in an AFP envelope, as well as an AFP print file. Server 610 processes the AFP envelope and detects a Medium Map relating to the pages of the received print data. Therefore, server 610 initiates processing of the Medium Map. The Medium Map does not include AFP job ticket instructions, but does include an Object Container structure that holds the JDF job ticket. Server 610 processes the Medium Map to generate an IPDS communication, and the IPDS communication includes a container for holding the Object Container structure (i.e., the wrapped JDF instructions). Server 610 transmits the IPDS container along with IPDS print commands for the print data, which are received by print controller 622 of printer 620. Print controller 622 receives the IPDS container and identifies the JDF job ticket included within. Therefore, print controller 622 extracts the JDF job ticket and initiates processing of the JDF job ticket. The JDF processing capabilities of print controller 622 have been enhanced to handle the processing of JDF job tickets for sequential streams of pages provided via IPDS. Thus, based upon the JDF job ticket instructions, print controller 622 adjusts the manner in which it processes the incoming IPDS print commands and pages. The processed IPDS print commands and pages are then sent to marking engine 624, which generates printed output 630 representing a printed version of the job.

Specifically, while processing a JDF job ticket, print controller 622 enters a job ticket mode, wherein the JDF instructions are applied to each received page of print data. This proceeds until another JDF job ticket is received, or until an IPDS command is received at print controller 622 that overrides current job ticket instructions. While processing job ticket instructions, it may be desirable to identify the page number of each incoming page of print data. Thus, in order to determine the page number for received pages, print controller 622 acquires a page ID from a Begin Page command of each page. Thus, print controller 622 may manage the actions of marking engine 624 in order to generate a printed output while utilizing native-format JDF commands.

Figure 7:
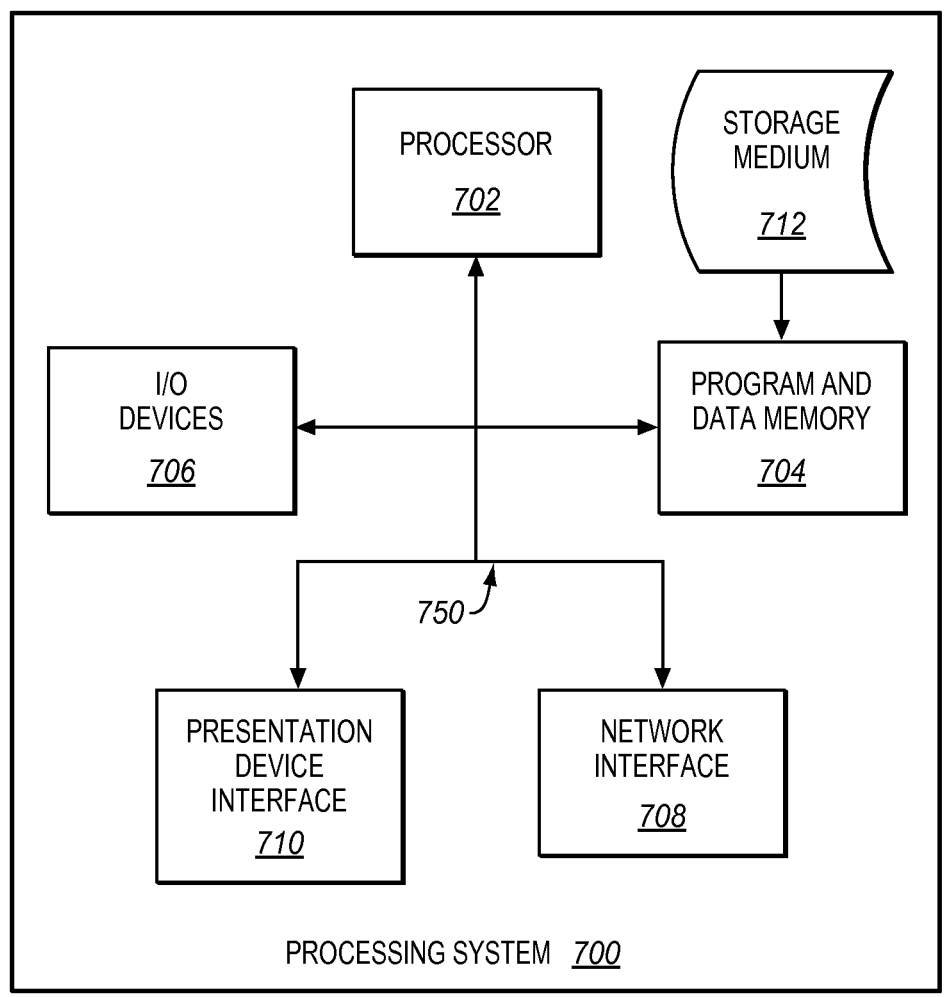
FIG. 7 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of printing system 100 to perform the various operations disclosed herein. FIG. 7 illustrates a processing system 700 operable to execute a computer readable medium embodying programmed instructions to perform desired functions in an exemplary embodiment. Processing system 700 is operable to perform the above operations by executing programmed instructions tangibly embodied on computer readable storage medium 712. In this regard, embodiments of the invention can take the form of a computer program accessible via computer-readable medium 712 providing program code for use by a computer or any other instruction execution system. For the purposes of this description, computer readable storage medium 712 can be anything that can contain or store the program for use by the computer.

Computer readable storage medium 712 can be an electronic, magnetic, optical, electromagnetic, infrared, or semiconductor device. Examples of computer readable storage medium 712 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 700, being suitable for storing and/or executing the program code, includes at least one processor 702 coupled to program and data memory 704 through a system bus 750. Program and data memory 704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 706 (including but not limited to keyboards, displays, pointing devices, etc.) can be coupled either directly or through intervening I/O controllers. Network adapter interfaces 708 may also be integrated with the system to enable processing system 700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 710 may be integrated with the system to interface to one or more presentation devices, such as printing systems and displays for presentation of presentation data generated by processor 702.

Although specific embodiments were described herein, the scope of the invention is not limited to those specific embodiments. The scope of the invention is defined by the following claims and any equivalents thereof.

We claim:

1. A system comprising:
a client operable to acquire print data for a print job; and
a job ticket manager operable to acquire a first job ticket that is defined according to a first language, and to wrap a second job ticket defined according to a second language within the first job ticket;
the client further operable to transmit the print data and the first job ticket to a server operable to process job tickets defined according to the first language.

2. The system of claim 1 wherein:
the job ticket manager is further operable to wrap the second job ticket within the first job ticket by inserting the second job ticket into a data structure of the first job ticket without modifying the second job ticket.

3. The system of claim 1 wherein:
the job ticket manager is further operable to generate the first job ticket to include Advanced Function Presentation (AFP) instructions, and to generate the second job ticket to include Job Definition Format (JDF) instructions.

4. The system of claim 3 wherein:
the first job ticket comprises an AFP Form Map; and
the job ticket manager is further operable to wrap the second job ticket within an Object Container structure of a Medium Map of the AFP Form Map.

5. The system of claim 4 wherein:
the job ticket manager is further operable to wrap the second job ticket within an Object Container structure that includes a tag identifying the language of the second job ticket as JDF.

6. The system of claim 3 wherein:
the first job ticket comprises an AFP Form Map; and
the job ticket manager is further operable to divide the second job ticket into multiple segments that each include instructions for processing a group of pages of the print data, and to wrap each segment within an Object Container structure of a Medium Map of the AFP Form Map.

7. The system of claim 1 wherein:
the client is further operable to acquire print data defined according to a Page Description Language (PDL).

8. A system comprising:
a server operable to receive print data, to receive a first job ticket for processing the print data that is defined according to a first language, to analyze the first job ticket to identify a second job ticket that is wrapped within the first job ticket and defined according to a second language, to extract the second job ticket from the first job ticket, to transmit the extracted second job ticket to a print controller for processing, and to transmit the print data to the print controller for printing.

9. The system of claim 8 wherein:
the first job ticket is defined according to Advanced Function Presentation (AFP), the print data is defined according to AFP, the second job ticket is defined according to Job Definition Format (JDF), and
the server is further operable to generate Intelligent Printer Data Stream (IPDS) communications for the print data, and to transmit the print data to the print controller via the IPDS communications.

10. The system of claim 9 wherein:
the first job ticket comprises an AFP Form Map; and
the server is further operable to extract the second job ticket from within a Medium Map of the AFP Form Map.

11. The system of claim 10 wherein:
the server is further operable to extract the second job ticket from within a Medium Map that includes a tag identifying the language of the second job ticket as JDF.

12. The system of claim 9 wherein:
the first job ticket comprises an AFP Form Map; and
the server is further operable to identify the second job ticket as comprising multiple segments that each include instructions for processing a group of pages of the print data, and to extract each segment from within a Medium Map of the AFP Form Map.

13. The system of claim 9 wherein:
the server is further operable to wrap the extracted second job ticket in an IPDS communication directed to the print controller.

14. The system of claim 10 wherein:
the server is further operable to detect a first Medium Map including AFP job ticket instructions for a first group of pages of the print job, to detect a second Medium Map including JDF job ticket instructions for a second group of pages, to process print data for the first group of pages according to the AFP job ticket instructions to generate IPDS communications, to transmit the IPDS communications to the print controller, and to transmit the JDF job ticket instructions along with print data for the second group of pages to the print controller for processing.

15. The system of claim 8 wherein:
the server is further operable to receive print data defined according to a Page Description Language (PDL).

16. A system comprising:
a print controller operable to receive print data for a print job, to receive a communication defined according to a first language, to receive a job ticket defined according to a second language and wrapped in the communication, to analyze the communication to identify the job ticket, to extract the job ticket from the communication defined according to the first language, and to process the received print data in accordance with the job ticket defined according to the second language.

17. The system of claim 16 wherein:
the print controller is further operable to receive communications defined according to Intelligent Printer Data Stream (IPDS) standards.

18. The system of claim 17 wherein:
the job ticket is defined according to Job Definition Format (JDF), and
the print controller is further operable to analyze JDF instructions of the job ticket to process the print job.

19. The system of claim 18 wherein:
the communication includes a tag identifying the language of the job ticket as JDF.

20. The system of claim 16 wherein:
the print controller is further operable to identify multiple communications that each wrap a job ticket for the print job that is defined according to the second language, and to extract the job tickets from the communications for processing with the print data.

21. The system of claim 16 wherein:
the print controller is further operable to instruct a marking engine of a printer to mark the processed print data onto physical media.

22. A method comprising:
acquiring print data for a print job;
acquiring a first job ticket defined according to a first language for the print job;
wrapping a second job ticket defined according to a second language within the first job ticket; and
transmitting the print data and the first job ticket to a server operable to process job tickets defined according to the first language.

23. The method of claim 22 wherein:
the first language comprises Advanced Function Presentation (AFP); and
the second language comprises Job Definition Format (JDF).

24. The method of claim 22 further comprising:
receiving the print data and the first job ticket at the server;
analyzing the first job ticket to identify the second job ticket wrapped within the first job ticket at the server;
extracting the second job ticket from the first job ticket at the server;
transmitting the print data to a print controller for printing; and
transmitting the second job ticket to the print controller for processing.

25. The method of claim 24 further comprising:
receiving the print data at the print controller;
receiving a communication at the print controller that encapsulates the second job ticket;
analyzing the communication to identify the second job ticket;
extracting the second job ticket from the communication; and
processing the received print data in accordance with the second job ticket.

26. The method of claim 22 further comprising:
dividing the second job ticket into multiple segments;
wrapping each segment within a different data structure of the first job ticket.

27. The method of claim 22 wherein:
the first job ticket comprises an AFP Form Map; and
wrapping the second job ticket comprises inserting the second job ticket within an Object Container structure of a Medium Map of the AFP Form Map.

28. The method of claim 22 wherein:
wrapping the second job ticket within the first job ticket comprises inserting the second job ticket into a data structure of the first job ticket without modifying the second job ticket.

29. A non-transitory computer readable medium embodying programmed instructions which, when executed by a processor, are operable for performing a method comprising:
acquiring print data for a print job;
generating a first job ticket defined according to a first language for the print job;
wrapping a second job ticket defined according to a second language within the first job ticket; and
transmitting the print data and the first job ticket to a server.

30. The medium of claim 29 wherein:
the first language comprises Advanced Function Presentation (AFP); and
the second language comprises Job Definition Format (JDF).

31. The medium of claim 29 wherein the method further comprises:
receiving the print data and the first job ticket at the server;
analyzing the first job ticket to identify the second job ticket wrapped within the first job ticket at the server;
extracting the second job ticket from the first job ticket at the server;
transmitting the print data to a print controller for printing; and
transmitting the second job ticket to the print controller for processing.

32. The medium of claim 31 wherein the method further comprises:
receiving the print data at the print controller;
receiving a communication at the print controller that encapsulates the second job ticket;
analyzing the communication to identify the second job ticket;
extracting the second job ticket from the communication; and
processing the received print data in accordance with the second job ticket.

33. The medium of claim 29 wherein the method further comprises:
dividing the second job ticket into multiple segments;
wrapping each segment within a different data structure of the first job ticket.

34. The medium of claim 29 wherein:
the first job ticket comprises an AFP Form Map; and
wrapping the second job ticket comprises inserting the second job ticket within an Object Container structure of a Medium Map of the AFP Form Map.

35. The medium of claim 29 wherein:
wrapping the second job ticket within the first job ticket comprises inserting the second job ticket into a data structure of the first job ticket without modifying the second job ticket.

\* \* \* \* \*